US009180841B2

(12) United States Patent
Suzuki et al.

(10) Patent No.: US 9,180,841 B2
(45) Date of Patent: Nov. 10, 2015

(54) DISK BRAKE

(71) Applicant: HITACHI AUTOMOTIVE SYSTEMS, LTD., Ibaraki (JP)

(72) Inventors: Shinji Suzuki, Kanagawa (JP); Jun Watanabe, Kanagawa (JP); Satoru Tsurumi, Kanagawa (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 13/686,255

(22) Filed: Nov. 27, 2012

(65) Prior Publication Data

US 2013/0133990 A1    May 30, 2013

(30) Foreign Application Priority Data

Nov. 29, 2011  (JP) ................. 2011-260278

(51) Int. Cl.
| | |
|---|---|
| F16D 55/22 | (2006.01) |
| B60T 1/06 | (2006.01) |
| F16D 55/2265 | (2006.01) |
| F16D 55/227 | (2006.01) |
| F16D 55/00 | (2006.01) |
| F16D 121/04 | (2012.01) |
| F16D 121/24 | (2012.01) |
| F16D 123/00 | (2012.01) |
| F16D 125/36 | (2012.01) |

(Continued)

(52) U.S. Cl.
CPC ............... *B60T 1/065* (2013.01); *F16D 55/227* (2013.01); *F16D 55/22655* (2013.01); *F16D 2055/0008* (2013.01); *F16D 2121/04* (2013.01); *F16D 2121/24* (2013.01); *F16D 2123/00* (2013.01); *F16D 2125/36* (2013.01); *F16D 2125/48* (2013.01); *F16D 2125/50* (2013.01)

(58) Field of Classification Search
CPC .......... F16D 55/2262; F16D 55/22655; F16D 55/227
USPC .................... 188/73.45, 156–158, 162, 106 F
See application file for complete search history.

(56) References Cited

U.S. PATENT DOCUMENTS 4,061,209 A * 12/1977 Gee et al. ................... 188/73.36
6,047,795 A *  4/2000 Kobayashi et al. ........ 188/73.45
(Continued)

FOREIGN PATENT DOCUMENTS

| | | |
|---|---|---|
| JP | 10-30659 | 2/1998 |
| JP | 2006-207722 | 8/2006 |

OTHER PUBLICATIONS

Office Action issued Mar. 18, 2015 in corresponding Japanese patent application No. 2011-260278 (with English translation).

*Primary Examiner* — Bradley King
(74) *Attorney, Agent, or Firm* — Wenderoth, Lind & Ponack, L.L.P.

(57) ABSTRACT

A disk brake including a mount member having a pin insertion portion integrally connected to a connection portion so as to outwardly protrude from an outer surface of the connection portion in a radial direction of a disk rotor. A tip of a pin insertion hole of the pin insertion portion is positioned at an inner side of a vehicle relative to an outer portion. Thus, it is possible to prevent a braking torque from affecting the pin insertion portion of the mount member. As a result, it is possible to prevent a slide pin from interfering with an inner wall surface of the pin insertion hole, thereby preventing a brake judder phenomenon from occurring during a braking operation.

12 Claims, 9 Drawing Sheets

(51) Int. Cl.
*F16D 125/48* (2012.01)
*F16D 125/50* (2012.01)

(56) References Cited

U.S. PATENT DOCUMENTS

| | | | |
|---|---|---|---|
| 6,135,246 A * | 10/2000 | Gautier | 188/73.45 |
| 6,223,867 B1 * | 5/2001 | Doi et al. | 188/73.45 |
| 6,247,561 B1 * | 6/2001 | Doi et al. | 188/73.39 |
| 6,454,056 B1 * | 9/2002 | Iida | 188/73.45 |
| 8,376,094 B2 * | 2/2013 | Yamasaki et al. | 188/72.8 |
| 2004/0016609 A1 * | 1/2004 | Takeda et al. | 188/73.31 |
| 2005/0217951 A1 * | 10/2005 | Iwasaki | 188/218 XL |
| 2006/0049008 A1 * | 3/2006 | Kinoshita et al. | 188/73.39 |
| 2008/0264735 A1 * | 10/2008 | Matsushita et al. | 188/68 |

\* cited by examiner

DISK BRAKE

BACKGROUND OF THE INVENTION

The present invention relates to a disk brake for use in braking of a vehicle.

Conventional disk brakes include a mount member attached to a non-rotatable portion of a vehicle, and a caliper, as disclosed in Japanese Patent Public Disclosure No. 2006-207722. The mount member includes a pair of arm portions, and the pair of arm portions are spaced apart from each other along a circumferential direction of a disk and are disposed so as to axially extend over the disk. The caliper is slidably attached to the arm portions of the mount member with use of, for example, slide pins. An inner-side frictional pad and an outer-side friction pad are pressed against the respective surfaces of the disk by the caliper. The slide pins are attached to the caliper, and are slidably fitted in pin insertion holes formed at the respective arm portions of the mount member.

However, according to the disk brake disclosed in Japanese Patent Public Disclosure No. 2006-207722, when the mount member receives a braking torque from the pair of frictional pads, especially due to elastic deformation of an outer-side leg portion of the mount member, the slide pins may interfere with the inner wall surfaces of the pin insertion holes of the respective arm portions. More specifically, the slide pins scrape interiors of the pin insertion holes, thereby increasing sliding resistance between the slide pins and the inner walls of the pin insertion holes during a braking operation, leading to a high possibility of occurrence of a brake judder phenomenon.

SUMMARY OF THE INVENTION

An object of the present invention is to provide a disk brake capable of ensuring slidability of a caliper relative to a mount member.

To achieve the above-described and other objects, the present invention provides a disk brake including a mount member configured to be attached to a non-rotational portion of a vehicle over a disk and including a pin insertion portion extending in a disk axial direction of the disk, a caliper supported by the mount member via a slide pin fitted in the pin insertion portion of the mount member so as to be slidably movable in the disk axial direction, and at least a pair of frictional pads positioned at respective surface sides of the disk, attached so as to be movable relative to the mount member in the disk axial direction, and configured to be pressed against the respective surfaces of the disk by the caliper. The mount member includes an inner-side torque receiving portion configured to receive a braking torque of the inner-side frictional pad, which is one of the pair of frictional pads at an inner side corresponding to a non-rotational portion side of the vehicle, an outer-side torque receiving portion configured to receive a braking torque of the outer-side frictional pad, which is the other of the pair of frictional pads at an outer side corresponding to an opposite side of the disk from the inner side, and a connection portion connecting the outer-side torque receiving portion and the inner-side torque receiving portion. The pin insertion portion is provided so as to outwardly protrude from an outer surface of the connection portion in a disk radial direction of the disk. A bottom of a pin insertion hole, which is internally formed as a bottomed hole, is positioned closer to the inner-side torque receiving portion than the outer-side torque receiving portion is to the inner-side torque receiving portion.

DETAILED DESCRIPTION OF THE PREFERRED EMBODIMENTS

Figure 1:
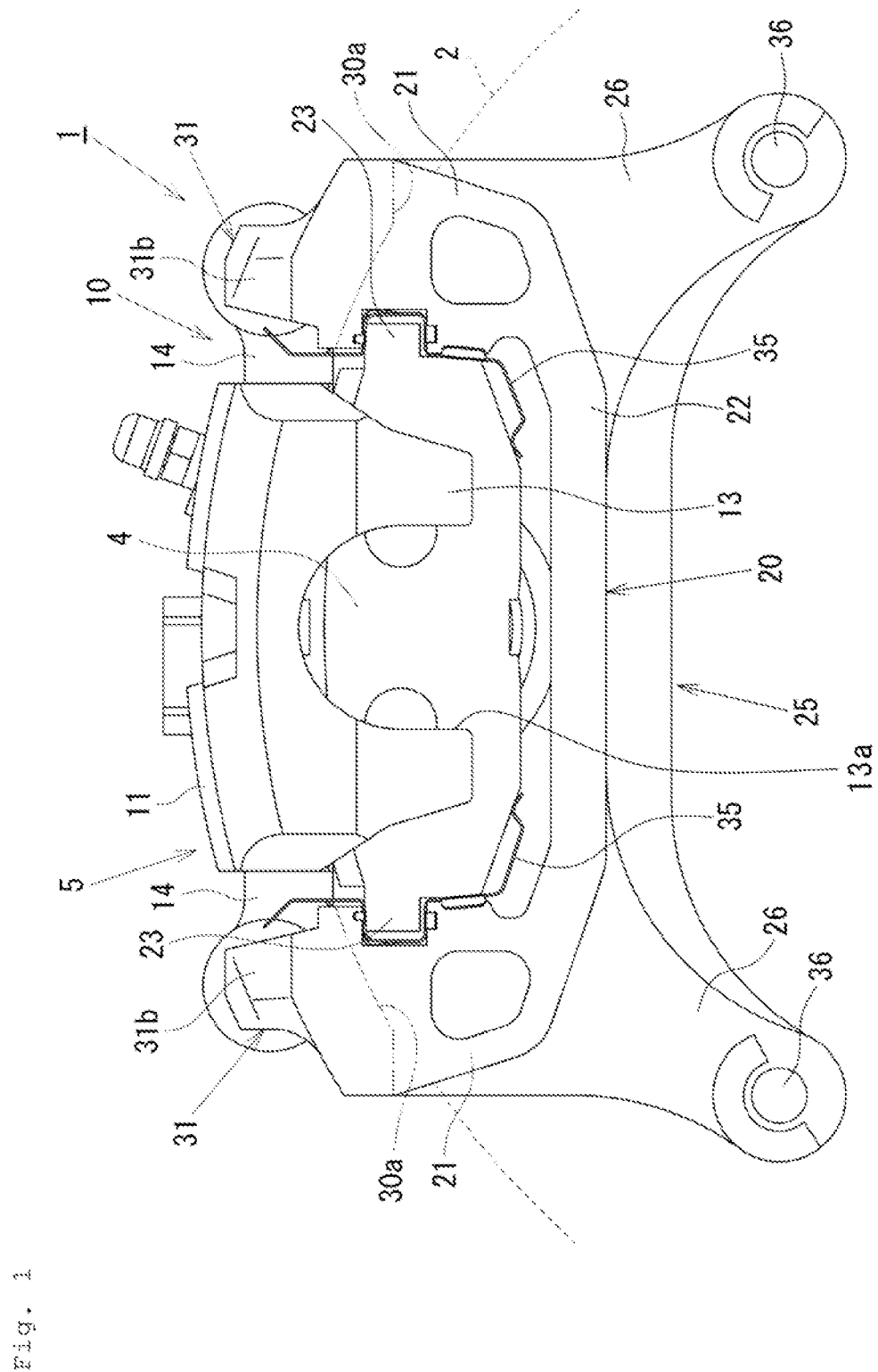
FIG. 1 an exterior view of a disk brake according to a first embodiment as viewed from an angle corresponding to an outer side of a vehicle.

Hereinafter, a first embodiment will be described with reference to FIGS. 1 to 5. In the following description, the term "outer side" will be used to refer to a wheel side as viewed at a disk rotor 2 (the right side in FIG. 2), and the term "inner side" will be used to refer to a central side as viewed at the disk rotor 2 in a lateral direction of a vehicle, which is an opposite side from the wheel (the left side in FIG. 2). Further, the term "disk axial direction" will be used to refer to an axial direction of a rotational axis of the disk rotor 2. The term "disk radial direction" will be used to refer to a radial direction of the disk rotor 2. The term "disk rotational direction" will be used to refer to a rotational direction of the disk rotor 2.

As illustrated in FIGS. 1 to 4, a disk brake 1 according to the first embodiment includes a pair of frictional pads, i.e., an inner-side frictional pad 3 and an outer-side frictional pad 4 disposed at opposite sides of the disk rotor 2 attached to a rotational portion of the vehicle, a caliper 5 configured to press these frictional pads 3 and 4 against the disk rotor 2, and a mount member 10 fixed to a non-rotational portion of the vehicle such as a knuckle. The mount member 10 supports the pair of frictional pads, i.e., the inner-side frictional pad 3 and the outer-side frictional pad 4, and the caliper 5 in such a manner that they are respectively movable in the disk axial direction. In other words, the disk brake 1 is configured as a floating caliper disk brake.

The caliper 5 includes a bridge portion 11, a cylinder portion 12, a claw portion 13, and a pair of arm portions 14 and 14. These portions are integrally formed to constitute the caliper 5. The bridge portion 11 is formed so as to extend in the axial direction of the disk rotor 2 over an outer circumference of the disk rotor 2. The cylinder portion 12 is integrally formed at one end side (i.e., the inner side) of the bridge portion 11, and is disposed so as to face a surface of the inner-side frictional pad 3 opposite from the disk rotor 2. A cylinder bore (not illustrated) is formed inside the cylinder portion 12. A piston (not illustrated) is slidably and fittedly inserted in the cylinder bore. A hydraulic chamber (not illustrated) is defined in the cylinder bore. A hydraulic pressure is supplied from a master cylinder (not illustrated) to the hydraulic chamber. The supply of the hydraulic pressure into the hydraulic chamber causes the piston to be thrust toward the inner-side frictional pad 3 in the cylinder bore to then press the inner-side frictional pad 3 against the disk rotor 2.

The claw portion 13 is integrally formed at the other end side of the bridge portion 11, and is disposed so as to face a surface of the outer-side frictional pad 4 opposite from the disk rotor 2. The claw portion 13 is formed as a two-block structure including a recess 13a at the center of the rotational direction of the disk rotor 2. The claw portion 13 does not necessarily have to be formed as a two-block structure, and may be formed as any structure allowing the interior of the cylinder 12 to be cut and processed. For example, the claw portion 13 may be formed as a one-block claw portion without the above-described recess formed thereon.

The pair of arm portions 14 and 14 are formed integrally with the cylinder portion 12 so as to respectively extend to the opposite sides of the cylinder 12 in the rotational direction of the disk rotor 2. Slide pins 15 and 15 are respectively attached to the tip sides of these arm portions 14 and 14 so as to extend in the axial direction of the disk rotor 2. This attachment is realized by inserting one ends of the slide pins 15 and 15 in pin attachment holes formed at the tip sides of the respective arm portions 14 and 14, and fixing the slide pins 15 and 15 to the arm portions 14 and 14 by bolts 38 and 38. Further, each of the slide pin 15 includes a groove 15a extending from the other end of the slide pin 15 at the vehicle outer side with a predetermined depth. This groove 15a serves as a grease reservoir allowing a sliding movement of the slide pin 15. Further, a rubber pin boot 40 is disposed between the one end of the slide pin 15 and the mount member 10. The rubber pin boot 40 includes an extendable and shrinkable bellows portion covering the slide pin 15.

Next, the mount member 10 will be described mainly with reference to FIG. 5, supplementarily with reference to FIGS. 1 to 4 as necessary. The mount member 10 includes an inner portion 25 positioned at the inner side relative to the disk rotor 2, an outer portion 20 disposed at the outer side relative to the disk rotor 2, connection portions 30 and 30 extending over the outer circumference of the disk rotor 2 in the disk axial direction to integrally connect the outer portion 20 and the inner portion 25, and pin insertion portions 31 and 31 formed so as to outwardly protrude from outer surfaces of the connection portions 30 and 30 in the disk radial direction and extendedly provided in the same direction as the connection portions 30 and 30.

The inner portion 25 includes a pair of inner-side torque receiving portions 26 and 26 spaced apart in the disk rotational direction, and an inner beam portion 27 connecting the inner-side torque receiving portions 26 and 26. The inner-side torque receiving portions 26 and 26 are in abutment with the both ends of the inner-side frictional pad 3 in the disk rotational direction, and support the inner-side frictional pad 3 movably in the disk axial direction. The respective inner-side torque receiving portions 26 and 26 receive a braking torque transmitted from the inner-side frictional pad 3 at the time of braking of the vehicle when the vehicle is running forward or backward. Fitting grooves 29 and 29 are formed at surfaces of the inner-side torque receiving portions 26 and 26 that face each other, respectively. Guide protrusions 28 and 28 are formed at the both ends of the inner-side frictional pad 3 in the disk rotational direction (for example, refer to FIG. 4). The guide protrusions 28 and 28 of the inner-side frictional pad 3 are slidably fitted in the fitting grooves 29 and 29 via pad springs 35 and 35 attached to the mount member 10. Attachment holes 36 and 36 are formed at the inner beam portion 27 for attaching the mount member 10 to the non-rotational portion of the vehicle such as a knuckle.

The outer portion 20 includes a pair of outer-side torque receiving portions 21 and 21 spaced apart in the disk rotational direction, and an outer beam portion 22 connecting the outer-side torque receiving portions 21 and 21. The respective outer-side torque receiving portions 21 and 21 are in abutment with the both ends of the outer-side frictional pad 4 in the disk rotational direction, and support the outer-side frictional pad 4 movably in the disk axial direction. The respective outer-side torque receiving portions 21 and 21 receive a braking torque transmitted from the outer-side frictional pad 4 at the time of braking of the vehicle when the vehicle is running forward or backward. Further, fitting grooves 24 and 24 are formed at surfaces of the outer-side torque receiving portions 21 and 21 that face each other, respectively. Guide protrusions 23 and 23 are formed at the both ends of the outer-side frictional pad 4 in the disk rotational direction (for example, refer to FIG. 1). The guide protrusions 23 and 23 of the outer-side frictional pad 4 are slidably fitted in the fitting grooves 24 and 24 via pad springs 35 and 35 attached to the mount member 10. The outer beam portion 22 is formed so as to connect one ends of the respective outer-side torque receiving portions 21 and 21, which correspond to internal sides of the outer-side torque receiving portions 21 and 21 in the disk radial direction. The outer beam portion 22 is provided to maximally reduce deformation of one of the outer-side torque receiving portions 21 and 21 that is the outer-side torque receiving portion 21 positioned at a trailing edge side (namely a turning-out side or a rotation departing side) in the disk rotational direction, when this outer-side torque receiving portion 21 receives a braking torque at the time of braking of the vehicle. More specifically, the outer beam portion 22 reduces deformation of the one outer-side torque receiving portion 21 by functioning to allow the other outer-side torque receiving portion 21, i.e., the outer-side torque receiving portion 21 at a leading edge side (namely a turning-in side or a rotation entering side) in the disk rotational direction, which is supposed to be less deformed at the time of braking of the vehicle, to pull the one outer-side torque receiving portion 21, which is supposed to be largely deformed at the time of braking of the vehicle.

The connection portions 30 and 30 connect the other ends of the outer-side torque receiving portions 21 and 21, which correspond to the external sides of the outer-side torque receiving portions 21 and 21 in the disk radial direction, to the other ends of the inner-side torque receiving portions 26 and 26, which correspond to the external sides of the inner-side torque receiving portions 26 and 26 in the disk radial direction. Inner surfaces 30a and 30a of the connection portions 30 and 30 (refer to FIGS. 1, 3, 4, 5, and 7), which extend between the outer-side torque receiving portions 21 and 21 and the inner-side torque receiving portions 26 and 26, face the outer circumferential surface of the disk rotor 2.

Figure 3:
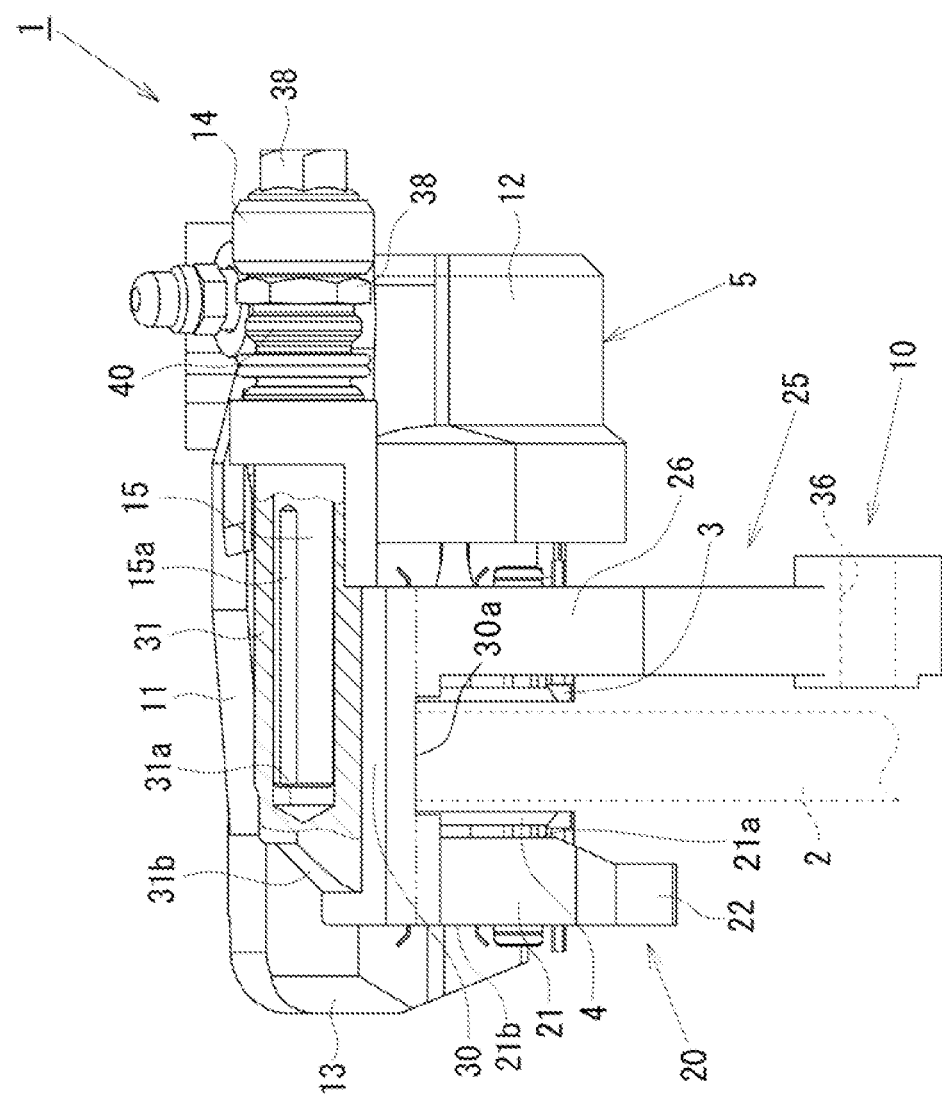
FIG. 3 is a partial cross-sectional view of the disk brake according to the first embodiment as viewed from one side in a rotational direction of a disk rotor.
Figure 5:
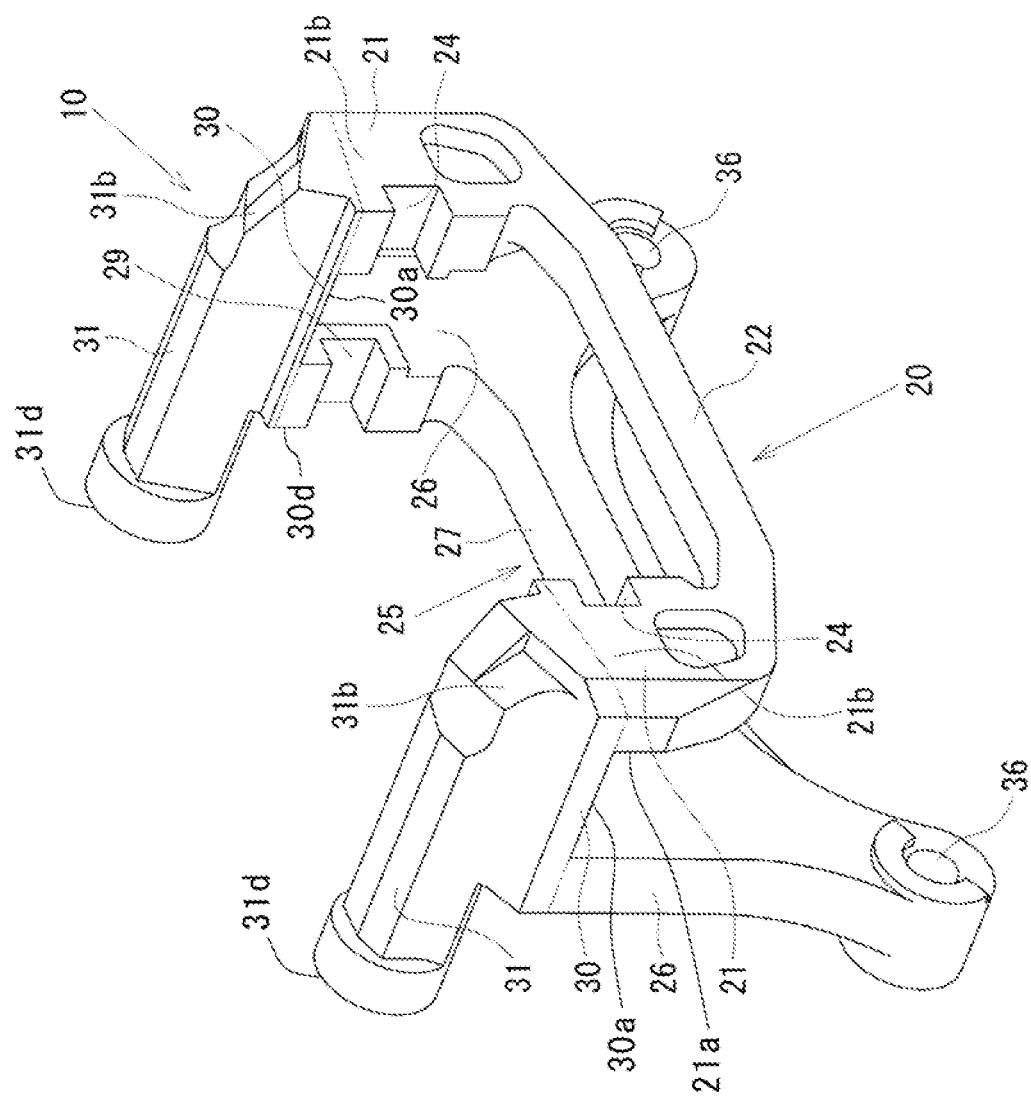
FIG. 5 is a perspective view of a mount member employed for the disk brake according to the first embodiment.

In the present embodiment, the boundary between the connection portion 30 and the inner-side torque receiving portion 26, and the boundary between the connection portion 30 and the outer-side torque receiving portion 21 are positioned as indicated by a two-dot chain line in FIGS. 1, 3, and 5, i.e., positioned as defined by the outline of the inner surface 30a.

The pin insertion portion 31 is integrally connected to the connection portion 30 so as to outwardly protrude from the outer circumferential surface of the connection portion 30 in the radial direction of the disk rotor 2. Further, the pin insertion portion 31 extends in the same disk axial direction as the direction in which the connection portion 30 extends. A pin insertion hole 31a is formed in the pin insertion portion 31. The pin insertion hole 31a is formed as a bottomed hole having a predetermined depth from the inner side to the outer side. The slide pin 15, which is fixed to the arm portion 14 of the caliper 5, is slidably inserted through the pin insertion hole 31a. A bottom 31c of the pin insertion hole 31a is formed so as to be positioned closer to the inner-side torque receiving portion 26 than the outer-side torque receiving portion 21 of the outer portion 20 is to the inner-side torque receiving portion 26. More specifically, the bottom 31c is formed so as to be positioned at the inner side relative to a surface 21a of the outer-side torque receiving portion 21 that faces the disk rotor 2, i.e., the inner-side surface 21a of the outer-side torque receiving portion 21 (the position indicated by a dotted line in FIG. 2). An outer-side end surface 31b of the pin insertion portion 31 is formed so as to be positioned at the inner side relative to a surface 21b of the outer-side torque receiving portion 21, which is the outer surface of the outer-side torque receiving portion 21 in the disk axial direction. Further, an inner-side end 31d (refer to FIGS. 2 and 5) of the pin insertion portion 31 is positioned so as to protrude beyond the inner portion 25 to the inner side.

Figure 4:
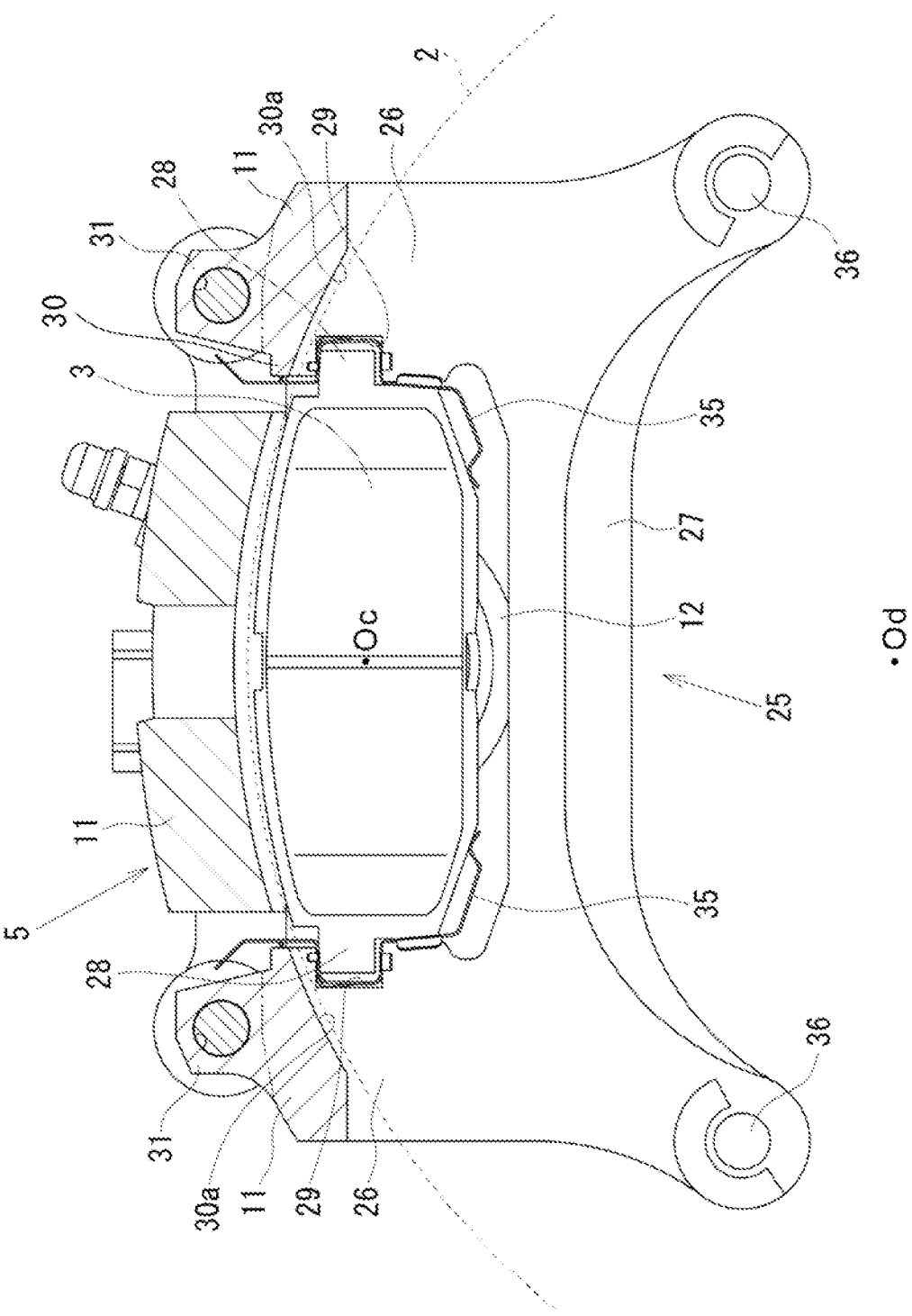
FIG. 4 is a cross sectional view of the disk brake taken along a line X-X illustrated in FIG. 2.

The boundary between the connection portion 30 and the pin insertion portion 31 are positioned as indicated by a dashed line in FIG. 4, and the boundary, i.e., the outer surface is defined by substantially extending a surface connecting the end of the external sides of the connection portion 30 in the disk radial direction to the position where the pin insertion portion 31 starts to protrude.

The slide pins 15 and 15, which are fixed to the respective arm portions 14 and 14 of the caliper 5, are slidably inserted in the pin insertion holes 31a and 31a of the pin insertion portions 31 and 31, respectively. This insertion allows the caliper 5 to be disposed in such a manner that the bridge portion 11 of the caliper 5 extends over the outer circumference of the disk rotor 2, the claw portion 13 of the caliper 5 faces the surface of the outer-side frictional pad 4 at the vehicle outer side, and the cylinder portion 12 faces the surface of the inner-side frictional pad 3 at the vehicle inner side. As a result, the caliper 5 is supported by the mount member 10 relatively movably along the axial direction of the disk rotor 2.

Next, an operation of the disk brake 1 according to the present embodiment at the time of braking will be described. When a driver presses a brake pedal (not illustrated), a hydraulic pressure is supplied from a master cylinder into the hydraulic chamber (not illustrated) in the caliper 5 according to the force pressing the brake pedal. This supply causes the piston (not illustrated) disposed in the cylinder portion 12 of the caliper 5 to move forward from its original position where the piston is positioned when no brake is applied to press the inner-side frictional pad 3 against the disk rotor 2 while deforming a piston seal (not illustrated). Then, the caliper 5 moves toward the inner side relative to the mount member 10 by a reaction force to the pressing force of the piston. This movement causes the claw portion 13 of the caliper 5 to press the outer-side frictional pad 4 against the disk rotor 2. As a result, the disk rotor 2 is sandwiched between the pair of inner-side and outer-side frictional pads 3 and 4, thereby generating a braking force to be applied to the vehicle.

At the time of this braking, a braking torque is transmitted from the pair of inner-side and outer-side frictional pads 3 and 4 to the inner-side torque receiving portion 26 and the outer-side torque receiving portion 21 of the mount member 10 at the trailing edge side of the disk rotor 2. Especially, the outer-side torque receiving portion 21 of the mount member 10 is positioned away from the attachment hole 36 of the inner beam portion 27, which serves as a fixation portion to the vehicle, and therefore is deformed by the transmission of the braking torque by a larger deformation amount than the inner-side torque receiving portion 26. As a result, the outer-side torque receiving portion 21 is deformed while being displaced to the trailing edge side largely than the inner-side torque receiving portion 26.

Figure 2:
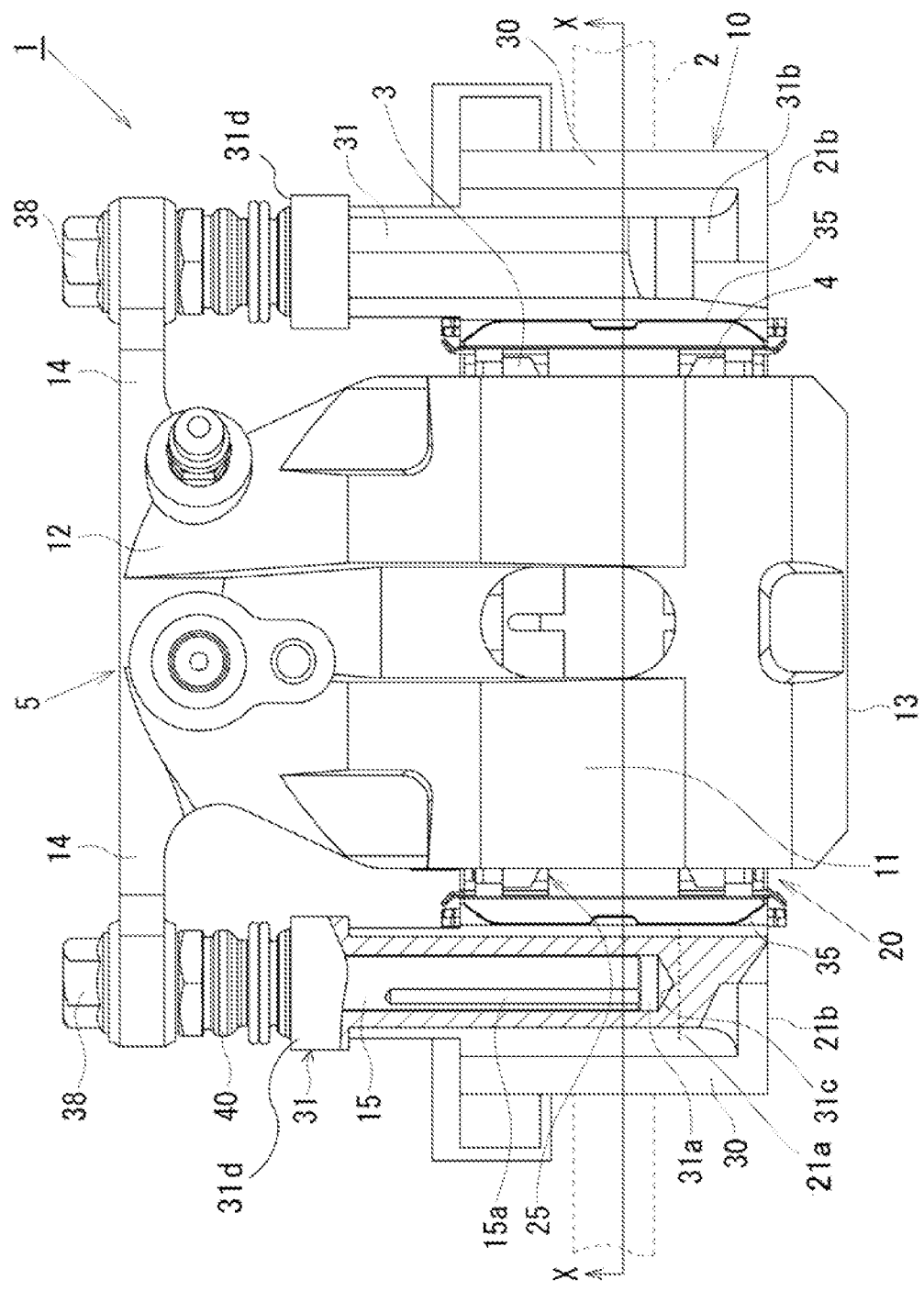
FIG. 2 is a plane view of the disk brake according to the first embodiment.

On the other hand, according to the above-described embodiment, the bottom 31c of the pin insertion hole 31a of the pin insertion portion 31 is positioned at the inner side relative to the inner surface 21a of the outer-side torque receiving portion 21 of the outer portion 20 (refer to FIG. 2). Therefore, the pin insertion portion 31 of the mount member 10 is less affected by the deformation of the outer-side torque receiving portion 21. As a result, it is possible to prevent elastic deformation of the pin insertion portion 31, and therefore possible to ensure the slidability of the slide pins 15, i.e., the slidability of the caliper 5 during a braking operation.

Especially, in the above-described embodiment, the inner-side end 31d of the pin insertion portion 31 extends to the inner side beyond the inner-side torque receiving portion 26. Therefore, a most of the slide pin 15 is subject to the deformation of the inner-side torque receiving portion 26, and only the tip of the slide pin 15 is affected by the deformation of the outer-side torque receiving portion 21, thereby reducing the influence of the deformation of the outer-side torque receiving portion 21.

Further, disk brakes tend to be deformed in such a manner that the angle between the claw portion and the cylinder portion increases around the end of the bridge portion at the cylinder portion side according to an increase in the hydraulic pressure in the hydraulic chamber in the caliper at the time of braking. Japanese Patent Public Disclosure No. 2006-207722 discusses a caliper configured in such a manner that a slide pin is positioned at the internal side in the disk radial direction relative to a line extending in a tangential direction of the disk rotor among lines intersecting an extension of a line connecting a center of a disk rotor and a center of a cylinder portion. According to this caliper, the above-described end of the bridge portion at the cylinder portion side, which is the center of the deformation, is located away from the slide pin. Therefore, the slide pin is largely inclined relative to the pin insertion hole of the mount member due to the deformation of the caliper, thereby deteriorating the slidability of the caliper relative to the mount member, leading to a high possibility of occurrence of a brake judder phenomenon.

To solve this problem, according to the present embodiment, the pin insertion portion 31 of the mount member 10 is integrally connected to the connection portion 30 so as to outwardly protrude from the outer surface of the connection portion 30 in the radial direction of the disk rotor 2. Then, the slide pin 15 is fixed to the tip of the arm portion 14 of the caliper 5. Thus the arm portion 14 is provided so as to extend from the position at the external side of the cylinder portion 12 in the disk radial direction relative to the outer circumference of the disk rotor 2, along a line extending in the tangential direction of the disk rotor 2 among lines intersecting an extension of a line connecting a center Od of the disk rotor 2 and a center Oc of the cylinder portion 12. Therefore, the position where the slide pin 15 is attached becomes closer to the center of the deformation of the caliper 5 (the end of the bridge portion 11 at the cylinder portion side), as a result of which the slide pin 15 is less inclined relative to the pin insertion hole 31a of the mount member 10, thereby reducing the influence of the deformation of the caliper 5 at the time of braking.

Therefore, it is possible to ensure the slidability of the caliper 5 relative to the mount member 10, and therefore possible to prevent occurrence of a brake judder phenomenon.

On the other hand, when the driver releases the brake pedal, the supply of the hydraulic pressure from the master cylinder stops, thereby reducing the hydraulic pressure in the hydraulic chamber in the caliper 5. As a result, the piston in the cylinder portion 12 moves backward to its original position according to a recovery of the elastic deformation of the piston seal. In this way, a vehicle braking force is released.

As mentioned above, the disk brake 1 according to the present embodiment is configured in such a manner that the pin insertion portion 31 of the mount member 10 is formed so as to outwardly protrude from the outer circumferential surface of the connection portion 30 in the radial direction of the disk rotor 2, and the bottom 31c of the pin insertion hole 31a of the pin insertion portion 31 is positioned closer to the inner-side torque receiving portion 26 than the outer-side torque receiving portion of the outer unit 20 is to the inner-side torque receiving portion 26, whereby the pin insertion portion 31 of the mount member 10 is less affected by the deformation of the outer-side torque receiving portion 21. As a result, it is possible to reduce elastic deformation of the pin insertion portion 31, and therefore possible to ensure the slidability of the slide pin 15, i.e., the slidability of the caliper 5 during a braking operation to prevent occurrence of a brake judder phenomenon during a braking operation.

Figure 6:
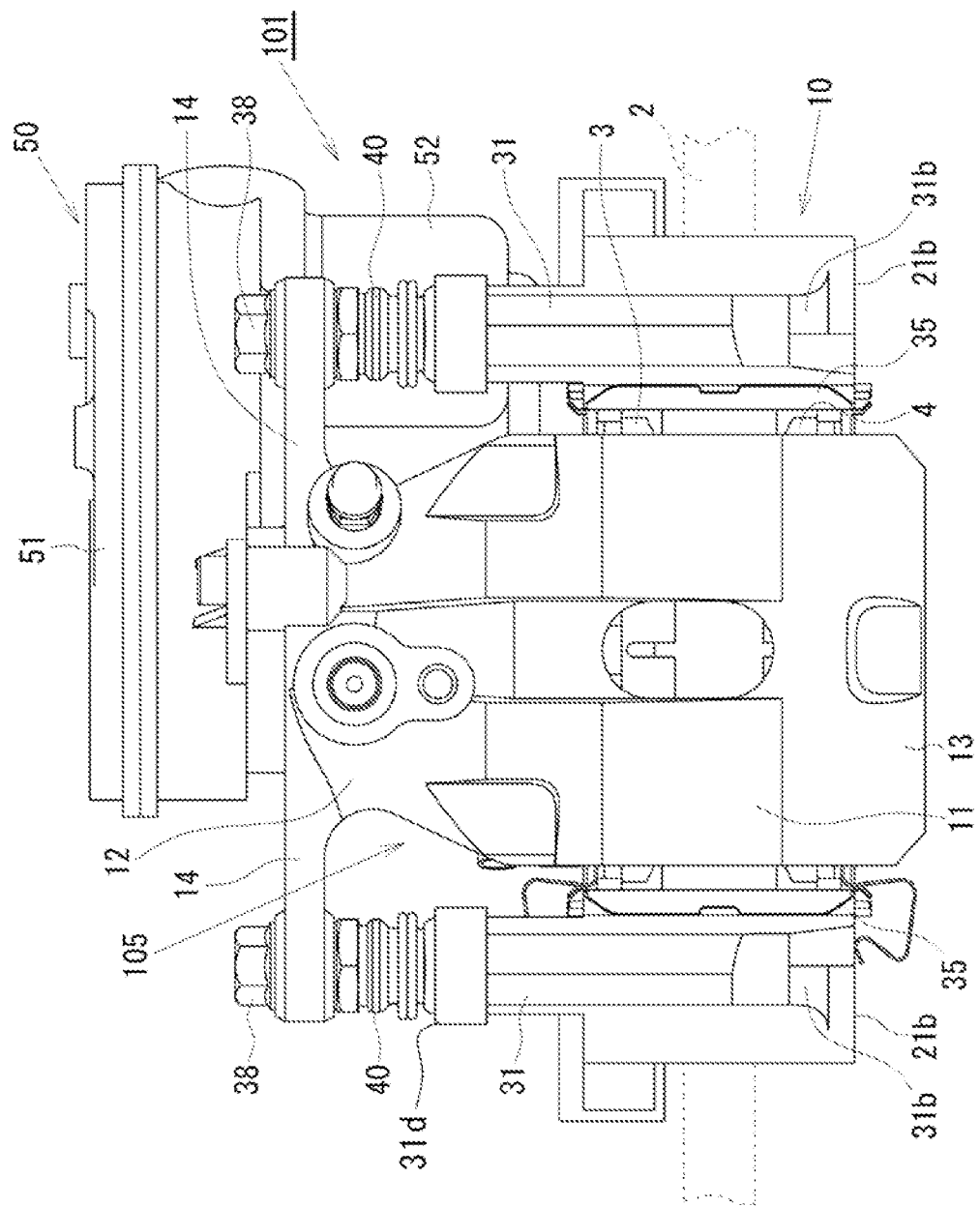
FIG. 6 is a plane view of a disk brake provided with an electric parking mechanism according to a second embodiment.
Figure 7:
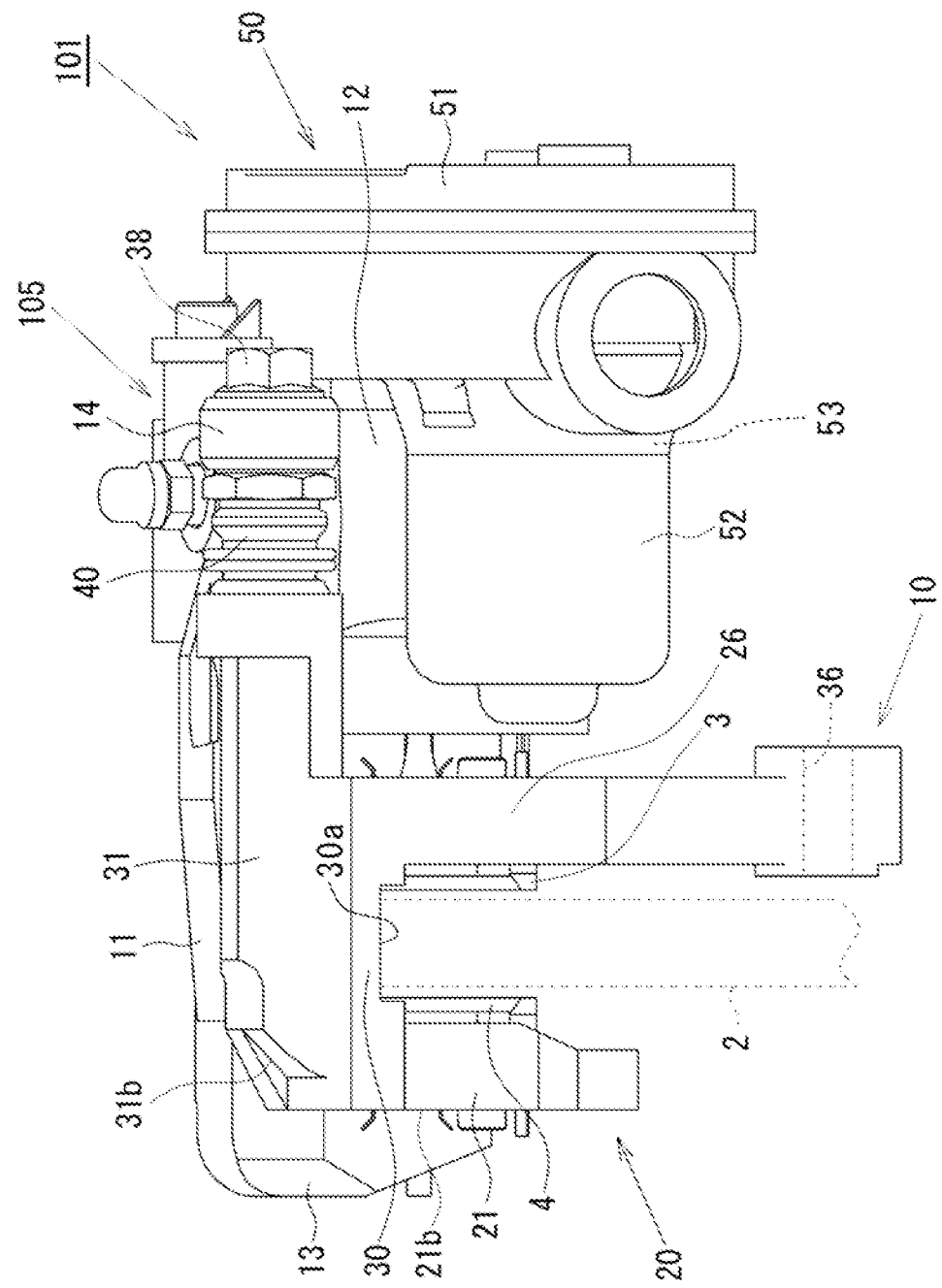
FIG. 7 is an external view of the disk brake provided with the electric parking mechanism according to the second embodiment as viewed from one side of a rotational direction of a disk rotor.
Figure 8:
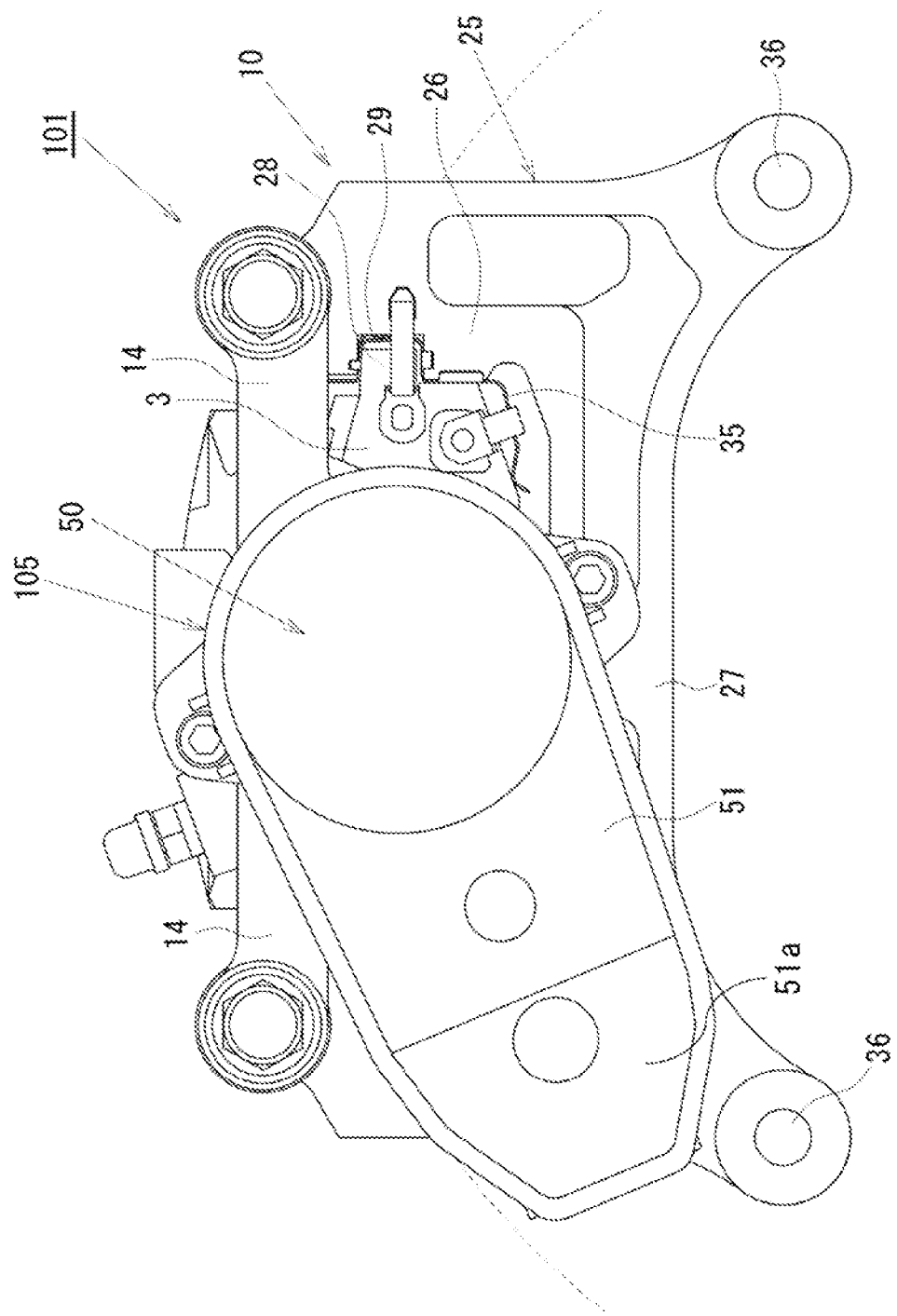
FIG. 8 is an exterior view of the disk brake provided with the electric parking mechanism according to the second embodiment as viewed from an angle corresponding to an inner side of the vehicle.

Next, a second embodiment will be described with reference to FIGS. 6 to 8. FIGS. 6 to 8 are exterior views. A disk brake 101 according to the second embodiment includes the above-described mount member 10, and the caliper 105 provided with an electric parking mechanism. The caliper 105 is slidably attached to the mount member 10.

An electric parking mechanism 50 is attached at the bottom side of the cylinder portion 12 of the caliper 105. As illustrated in FIG. 7, the electric parking mechanism 50 includes an electric motor 52, a reduction mechanism 53, and a housing 51 containing the electric motor 52 and the reduction mechanism 53. The reduction mechanism 53 is constituted by a plurality of gears for increasing a rotational force of the electric motor 52. The housing 51 rotatably supports the plurality of gears of the reduction mechanism 53. Further, the electric parking mechanism 50 includes a piston thrust mechanism (not illustrated) contained in the cylinder portion 12 and configured to mechanically thrust a piston (not illustrated) reciprocally movably contained in the cylinder portion 12. In other words, the electric parking mechanism 50 is constituted by the housing 51, the electric motor 52, the reduction mechanism 53, and the piston thrust mechanism. This piston thrust mechanism is configured in such a manner that a rotation of the electric motor 52 is transmitted via the reduction mechanism 53, and the transmitted rotational movement is converted into a linear movement, thereby thrusting the piston. In other words, in the present embodiment, a driving unit constituted by the housing 51, the electric motor 52, and the reduction mechanism 53 provides a thrust force to the piston thrust mechanism.

The above-described housing 51 is formed so as to have a substantially cuboid shape. The housing 51 extends from the center of the cylinder portion 12 in the radial direction along the disk rotational direction, and is disposed at the bottom side of the cylinder portion 12 of the caliper 105. Then, as illustrated in FIG. 8, a tip position 51a, to which the housing 51 extends, is positioned at the internal side in the disk radial direction relative to the pin insertion portion 31 of the mount member 10, and at the external side in the disk radial direction relative to the fixation portion 36 of the mount member 10. In other words, the pin insertion portion 31 of the mount member 10 is disposed at the external side in the disk radial direction relative to the tip position 51a of the housing 51, and the fixation portion 36 is positioned at the internal side in the disk radial direction relative to the tip position 51a of the driving unit 51, 52, and 53.

In this way, when the caliper 105 provided with the electric parking mechanism 50 is slidably disposed at the mount member 10, as illustrated in FIG. 8, the electric parking mechanism 50 can be positioned between the respective attachment holes 36 and 36 formed at the inner beam portion 27 of the mount member 10, and the respective pin insertion portions 31 and 31 (the respective slide pins 15 and 15), thereby improving the mountability of the disk brake 101 including the caliper 105 provided with the electric parking mechanism 50 to the vehicle. Further, the caliper 105 provided with the electric parking mechanism 50 has the center of gravity displaced backward toward the inner side, since the electric parking mechanism 50 is a heavy member. Even if the caliper having the center of gravity displaced toward the inner side in this way is attached to the mount member 10, since the range of the engagement length between the slide pins 15 and 15 and the pin insertion holes 31a and 31a is offset toward the inner side in terms of the disk rotor 2, it is possible to securely maintain the slidability of the caliper in a similar manner to the above-described first embodiment.

The present embodiment has been described based on an example of the disk brake including the caliper 105 provided with the electric parking mechanism 50. However, the present embodiment is not limited thereto, and the above-described mount member 10 may be applied to a disk brake including a caliper provided with a mechanical parking mechanism.

The disk brakes according to the above-described first and second exemplary embodiments each include the mount member 10 configured to be attached to the non-rotational portion of the vehicle over the disk 2 and including the pin insertion portion 31 extending in the disk axial direction of the disk 2, the caliper 5 or 105 supported by the mount member 10 via the slide pin 15 fitted in the pin insertion portion 31 of the mount member 10 so as to be slidably movable in the disk axial direction of the disk 2, and at least the pair of frictional pads 3 and 4 positioned at respective surface sides of the disk 2, attached so as to be movable relative to the mount member 10 in the disk axial direction of the disk 2, and configured to be pressed against the respective surfaces of the disk 2 by the caliper 5 or 105. The mount member 10 includes the inner-side torque receiving portion 26 configured to receive a braking torque of the inner-side frictional pad 3, which is one of the pair of frictional pads 3 and 4 at the inner side corresponding to the non-rotational portion side of the vehicle, the outer-side torque receiving portion 21 configured to receive a braking torque of the outer-side frictional pad 4, which is the other of the pair of frictional pads 3 and 4 at the outer side corresponding to the opposite side of the disk 2 from the inner side, and the connection portion 30 connecting the outer-side torque receiving portion 21 and the inner-side torque receiving portion 26. The pin insertion portion 31 is provided so as to outwardly protrude from the outer surface of the connection portion 30 in the disk radial direction of the disk 2. The bottom 31c of the pin insertion hole 31a, which is internally formed as the bottomed hole, is positioned closer to the inner-side torque receiving portion 26 than the outer-side torque receiving portion 21 is to the inner-side torque receiving portion 26.

According to this configuration, a most of the slide pin 15 is subject to the deformation of the inner-side torque receiving portion 26, and only the tip of the slide pin 15 is affected by the deformation of the outer-side torque receiving portion 21, thereby further reducing the influence of the deformation of the outer-side torque receiving portion 21. Therefore, it is possible to ensure the slidability of the slide pin 15, i.e., the slidability of the caliper during a braking operation. Accordingly, it is possible to prevent occurrence of a brake judder phenomenon.

In the disk brakes according to the first and second embodiments, the pin insertion portion 31 has the end surfaces 31*b* and 31*d* at the respective ends in the axial direction of the disk rotor 2. The outer-side end surface 31*b* of these end surfaces is formed so as to be positioned at the inner side in the disk axial direction relative to the outer-side end surface 21*b* of the connection portion 30, which is a surface of the connection portion 30 at the outer side in the disk axial direction. Due to this configuration, a most of the slide pin 15 is subject to the deformation of the inner-side torque receiving portion 26, and only the tip of the slide pin 15 is affected by the deformation of the outer-side torque receiving portion 21, thereby further reducing the influence of the deformation of the outer-side torque receiving portion 21. Therefore, it is possible to ensure the slidability of the slide pin 15, i.e., the slidability of the caliper during a braking operation. Accordingly, it is possible to prevent occurrence of a brake judder phenomenon.

In the disk brakes according to the first and second embodiments, the pin insertion portion 31 is configured in such a manner that the inner-side end surface 31*d* of the end surfaces 31*b* and 31*d* is formed at a position further away from the disk than the inner-side end surface 30*d* of the connection portion 30, which is a surface of the connection portion 30 at the inner side in the disk axial direction. Due to this configuration, a most of the slide pin 15 is subject to the deformation of the inner-side torque receiving portion 26, and only the tip of the slide pin 15 is affected by the deformation of the outer-side torque receiving portion 21, thereby further reducing the influence of the deformation of the outer-side torque receiving portion 21. Therefore, it is possible to ensure the slidability of the slide pin 15, i.e., the slidability of the caliper during a braking operation. Accordingly, it is possible to prevent occurrence of a brake judder phenomenon.

In the disk brakes according to the first and second embodiments, the caliper 5 or 105 includes the cylinder portion 12 reciprocally movably containing the piston configured to press the frictional pads 3 and 4, and the pair of arm portions 14 extending from the cylinder portion 12 and having the tips to which the slide pins 15 are fixed. The arm portions 14 are formed so as to extend from the positions of the cylinder portion 12 at the external side in the disk radial direction relative to the outer circumference of the disk, along the line extending in the tangential direction of the disk among lines intersecting the extension of the line connecting the center of the disk and the center of the cylinder portion 12. Due to this configuration, the position where the slide pin 15 is attached to the pin insertion portion 31 is positioned closer to the end of the bridge portion 11 at the cylinder portion side, which is the center of the caliper deformation at the time of braking, whereby the slide pin 15 is less inclined relative to the pin insertion hole 31*a* of the mount member 10, thereby reducing the influence of the deformation of the caliper 5 at the time of braking. Therefore, it is possible to ensure the slidability of the caliper relative to the mount member 10, and therefore possible to prevent occurrence of a brake judder phenomenon.

In the disk brakes according to the first and second embodiments, the arm portions 14 extend from the end of the cylinder portion 12 opposite from the end from which the piston protrudes in the disk axial direction. Due to this configuration, it is possible to secure the engagement length of the slide pins 15 with the pin insertion portions 31, thereby ensuring the slidability of the caliper 5 or 105 relative to the mount member 10.

In the disk brake according to the second embodiment, the caliper 105 includes the bottomed cylindrical cylinder portion 12 and the driving unit 51, 52, 53. The cylinder portion reciprocally movably contains the piston configured to press the frictional pads 3 and 4, and further contains the piston thrust mechanism configured to mechanically thrust the piston. The driving unit 51, 52, 53 is fixed to the bottom side of the cylinder portion 12 so as to provide a thrust force to the piston thrust mechanism. The driving unit 51, 52, 53 is disposed so as to extend from the center of the cylinder portion along the disk rotational direction. When the caliper 105 provided with this driving unit 51, 52, 53 is attached to the mount member 10, even through the center of gravity of the caliper 105 is positioned at the bottom side of the cylinder portion 12 due to the driving unit 51, 52, 53, it is possible to ensure the slidability of the caliper 105.

In the disk brake according to the second embodiment, the pin insertion portion 31 is positioned at the external side of the disk radial direction relative to the tip position 51*a* of the driving unit 51, 52, 53. Due to this configuration, at the time of detachment or attachment of the slide pin, which is supposed to be installed at the position corresponding to the pin insertion portion, it is possible to prevent this detachment or attachment from being disturbed by the driving unit, thereby improving the maintenability of the disk brake.

In the disk brake according to the second embodiment, the fixation portion 36, which is supposed to be fixed to the non-rotatable portion of the vehicle, is formed at the mount member 10, and the fixation portion 36 is positioned at the internal side in the disk radial direction relative to the tip position 51*a* of the driving unit 51, 52, 53. Due to this configuration, at the time of fixation of the mount member to the non-rotatable portion of the vehicle, it is possible to prevent the fixation process from being disturbed by the driving unit, thereby improving the efficiency of the installation of the disk brake to the vehicle.

Figure 9:
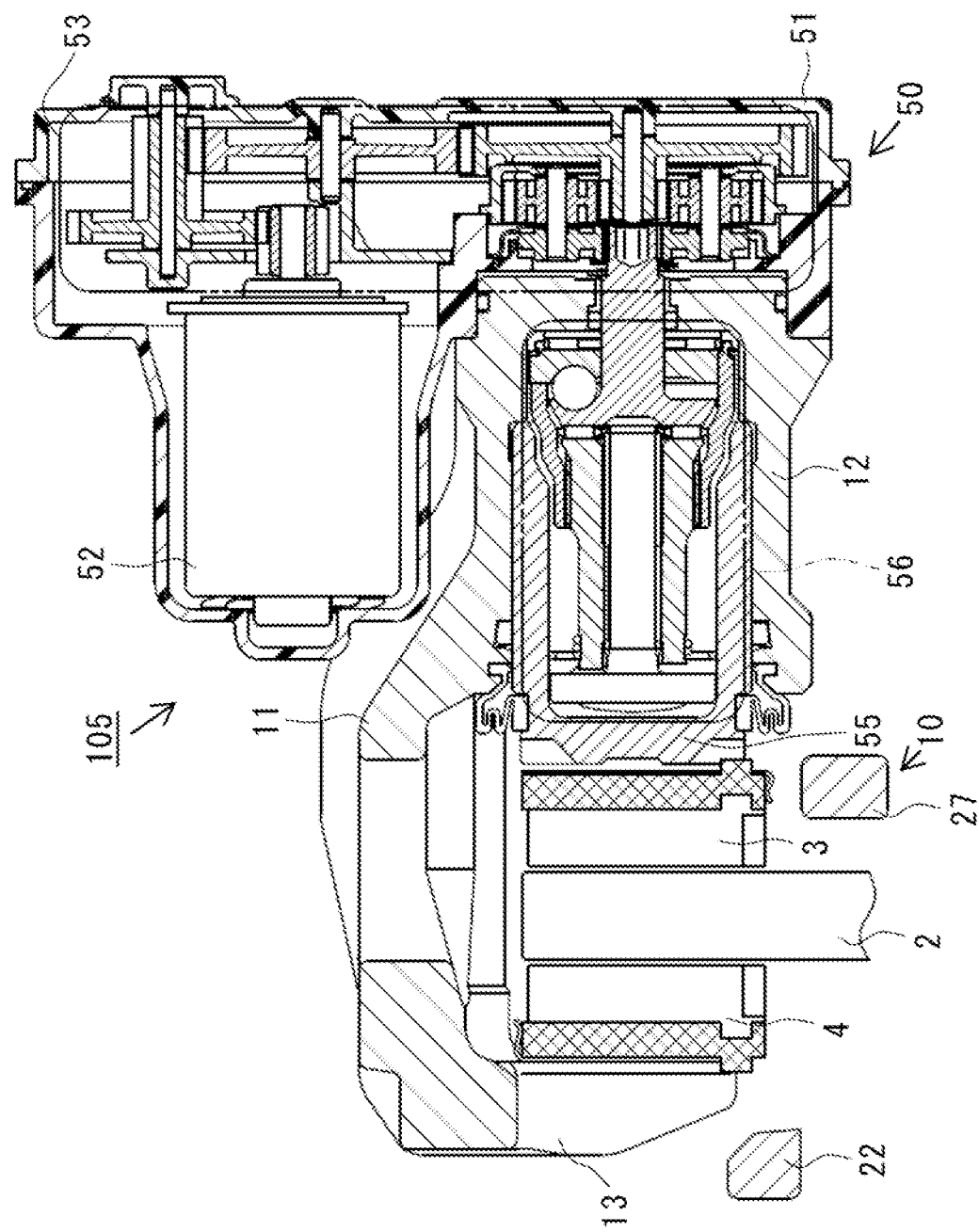
FIG. 9 is a partial cross-sectional view of a disk brake provided with an electric parking mechanism according to a third embodiment.

Next, referring to FIG. 9, description is made with regard to a third embodiment of the present invention. In FIG. 9 and the following explanation, those portions which are the same as or correspond to those in the first or second embodiment are designated by the same reference numerals as used in the first or second embodiment, and overlapping explanation is omitted.

FIG. 9 is a partial cross-sectional view illustrating a cross-section of a caliper 105 taken along the disk axial direction, and a cross-section of the mount member 10.

An electric parking mechanism 50 is attached at a side of the cylinder portion 12 of the caliper 105. As illustrated in the partial cross-sectional view of FIG. 9, the electric parking mechanism 50 includes an electric motor 52, a reduction mechanism 53, and a housing 51 containing the electric motor 52 and the reduction mechanism 53. The reduction mechanism 53 is constituted by a plurality of gears for increasing a rotational force of the electric motor 52. The housing 51 rotatably supports the plurality of gears of the reduction mechanism 53. Further, the electric parking mechanism 50 includes a piston thrust mechanism 56 contained in the cylinder portion 12 and configured to mechanically thrust a piston 55 reciprocally movably contained in the cylinder portion 12. In other words, the electric parking mechanism 50 is constituted by the housing 51, the electric motor 52, the reduction mechanism 53, and the piston thrust mechanism 56. This piston thrust mechanism 56 is configured in such a manner that a rotation of the electric motor 52 is transmitted via the reduction mechanism 53, and the transmitted rotational movement is converted into a linear movement, thereby thrusting the piston 55. In other words, in the present embodiment, a driving unit constituted by the housing 51, the electric motor 52, and the reduction mechanism 53 provides a thrust force to the piston thrust mechanism 56.

Please note that the internal structure of the disk brake which is omitted in the second embodiment is substantially the same as that of the third embodiment.

The first, second and third embodiments have been described based on an example of the caliper having only a single piston. However, the first, second, and third embodiments may be employed to a caliper having a plurality of pistons.

According to the disk brake of the present invention, it is possible to ensure the slidability of the caliper relative to the mount member.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Applications No. 2011-260278, filed on Nov. 29, 2011.

The entire disclosure of Japanese Patent Applications No. 2011-260278, filed on Nov. 29, 2011 including specification, claims, drawings and summary is incorporated herein by reference in its entirety.

What is claimed is:

1. A disk brake comprising:
a mount member configured to be attached to a non-rotational portion of a vehicle over a disk, the mount member including a pair of pin insertion portions extending in a disk axial direction of the disk;
a caliper supported by the mount member via slide pins so as to be slidably movable in the disk axial direction, the slide pins being fitted in the pair of pin insertion portions of the mount member; and
at least a pair of frictional pads positioned at respective surface sides of the disk and attached so as to be movable relative to the mount member in the disk axial direction, the at least pair of frictional pads being configured to be pressed against the respective surfaces of the disk by the caliper,
the mount member including:
an inner-side torque receiving portion configured to receive a braking torque of the inner-side frictional pad, which is one of the pair of frictional pads at an inner side corresponding to a non-rotational portion side of the vehicle;
an outer-side torque receiving portion configured to receive a braking torque of the outer-side frictional pad, which is the other of the pair of frictional pads at an outer side corresponding to an opposite side of the disk from the inner side; and
a connection portion arranged to connect the outer-side torque receiving portion and the inner-side torque receiving portion,
wherein the pin insertion portions are provided so as to outwardly protrude from an outer surface of the connection portion in a disk radial direction of the disk, wherein each of the pair of pin insertion portions includes a pin insertion hole and each of the pin insertion holes has a bottom of the pin insertion hole, which is internally formed as a bottomed hole,
wherein the bottom of each of the pin insertion holes is positioned closer to the inner-side torque receiving portion than the outer-side torque receiving portion is to the inner-side torque receiving portion, and
wherein each of the pin insertion portions is disposed on the mount member such that a line connecting the axes of the pin insertion portions is located outwardly of the periphery of the disk in the radial direction of the disk.

2. The disk brake according to claim 1, wherein each of the pair of pin insertion portions includes end surfaces at respective ends of the pin insertion portion in the disk axial direction of the disk, and the outer-side end surface, which is one of the end surfaces, is formed so as to be positioned at the inner side in the disk axial direction relative to an outer-side end surface of the connection portion at the outer side in the disk axial direction.

3. The disk brake according to claim 2, wherein each of the pair of pin insertion portions is configured in such a manner that the inner-side end surface, which is the other of the end surfaces, is formed at a position further away from the disk than an inner-side end surface of the connection portion at the inner side in the disk axial direction is from the disk.

4. The disk brake according to claim 3, wherein the caliper includes a cylinder portion reciprocally movably containing a piston configured to press the frictional pads, and a pair of arm portions extending from the cylinder portion and having a tip to which the slide pin is fixed, and
wherein each of the arm portions is disposed on a line which is parallel to a tangential direction of the disk and which intersects a first line L1 connecting a center Od of the disk and a center Oc of the cylinder portion from a position X at an external side of the cylinder portion in the disk radial direction relative to an outer circumference of the disk.

5. The disk brake according to claim 4, wherein the arm portions extend from an end of the cylinder portion opposite from an end of the cylinder portion from which the piston protrudes in the disk axial direction of the disk.

6. The disk brake according to any of claim 5, wherein the caliper includes:
the cylinder portion and a driving unit, the cylinder portion containing the piston configured to press the frictional pads in such a manner that the piston can protrude; and
a piston thrust mechanism configured to mechanically thrust the piston, the driving unit being fixed to a bottom side of the cylinder portion so as to provide a thrust force to the piston thrust mechanism,
wherein the driving unit is provided so as to extend from a center of the cylinder portion along a disk rotational direction of the disk.

7. The disk brake according to claim 6, wherein each of the pin insertion portions is positioned at the external side of the disk radial direction relative to a position of a tip of the driving unit.

8. The disk brake according to claim 7, wherein a fixation portion configured to be fixed to the non-rotational portion of the vehicle is formed at the mount member, and the fixation portion is positioned at an internal side of the disk radial direction relative to the tip position of the driving unit.

9. The disk brake according to claim 1, wherein the caliper includes a cylinder portion reciprocally movably containing a piston configured to press the frictional pads, and a pair of arm portions extending from the cylinder portion and having a tip to which the slide pin is fixed, and wherein each of the arm portions is disposed on a line L3 which is parallel to a tangential direction L2 of the disk and which intersects a first line L1 connecting a center Od of the disk and a center Oc of the cylinder portion from a position X at an external side of the cylinder portion in the disk radial direction relative to an outer circumference of the disk.

10. The disk brake according to claim 9, wherein the arm portions extend from an end of the cylinder portion opposite from an end of the cylinder portion from which the piston protrudes in the disk axial direction of the disk.

11. The disk brake according to any of claim 10, wherein the caliper includes:
the bottomed cylindrical cylinder portion and a driving unit, the cylinder portion containing the piston configured to press the frictional pads in such a manner that the piston can protrude; and
the piston thrust mechanism configured to mechanically thrust the piston, the driving unit being fixed to a bottom side of the cylinder portion so as to provide a thrust force to the piston thrust mechanism, and
wherein the driving unit is provided so as to extend from a center of the cylinder portion along the disk rotational direction of the disk.

12. The disk brake according to claim 11, wherein a fixation portion configured to be fixed to the non-rotational portion of the vehicle is formed at the mount member, and the fixation portion is positioned at an internal side of the disk radial direction relative to the tip position of the driving unit.

* * * * *